United States Patent Office 2,819,252
Patented Jan. 7, 1958

2,819,252
POLYMERIZATION OF ACROLEIN

Edward C. Shokal, Walnut Creek, Calif., assignor to Shell Development Company, New York, N. Y., a corporation of Delaware No Drawing. Application October 25, 1954
Serial No. 464,617

6 Claims. (Cl. 260—67)

This invention relates to the polymerization of unsaturated aldehydes. More particularly, the invention relates to a process for polymerizing ethylenically unsaturated aldehydes to form soluble fusible polymers, and to the utilization of these polymers, particularly in the preparation of resinous polyhydric alcohols.

Specifically, the invention provides a new and highly efficient process for polymerizing alpha,beta-ethylenically unsaturated aldehydes, such as acrolein and methacrolein, to form soluble fusible polymers which may be easily converted to resinous polyhydric alcohols. This process comprises contacting the monomeric alpha,beta-ethylenically unsaturated aldehydes with a catalytic amount of an oxide of a metal of the group consisting of copper, silver, cesium, beryllium, mercury, lead and tin, preferably in the presence of a liquid medium containing at least one OH group.

The invention further provides a method for converting the soluble fusible polymeric aldehydes prepared by the above-described process into valuable resinous polyhydric alcohols which comprises contacting the said polymer with hydrogen at an elevated temperature and pressure in the presence of a hydrogenation catalyst.

It is known that unsaturated aldehydes, such as acrolein, may be polymerized by the addition of bases, such as sodium hydroxide and sodium carbonate. Little use for these polymers as such has been found, however, and considerable effort has been put forth to try to convert the polymers to more useful products. Attempts have been made, for example, to hydrogenate the polymers to form polymeric polyhydric alcohols. These attempts have not been successful, however, because the aldehyde polymers produced by these methods have been resistant to hydrogenation and/or have been depolymerized in the presence of the hydrogen. Some polymeric polyhydric alcohols have been prepared from the unsaturated aldehydes (Evans—U. S. 2,478,154), but in this case it was first necessary to form a polymer of an ester derivative of the aldehyde, subject the polymer to hydrolysis and then hydrogenate the resulting polymeric aldehyde. This indirect method is obviously not economically attractive.

It is an object of the invention to provide method for polymerizing unsaturated aldehydes. It is a further object to provide a method for polymerizing unsaturated aldehydes to form polymers which may be easily hydrogenated to form valuable polymeric polyhydric alcohols. It is a further object to provide a new method for polymerizing alpha,beta-ethylenically unsaturated aldehydes, such as acrolein. It is a further object to provide a new method for polymerizing alpha,beta-ethylenically unsaturated aldehyes to form soluble fusible crystal clear polymers. It is a further object to provide a new method for preparing polymeric polyhydric alcohols from unsaturated aldehydes. These and other objects of the invention will be apparent from the following detailed description thereof.

It has now been found that these objects may be accomplished in part by the process of the invention which comprises contacting the monomeric alpha,beta-ethylenically unsaturated aldehydes with a catalytic amount of an oxide of metals of the group consisting of copper, silver, cesium, beryllium, mercury, lead and tin, preferably in the presence of a liquid medium containing at least one OH group, such as ethanol or isopropanol. When the unsaturated aldehydes are contacted with these special catalytic materials, they rapidly polymerize to form soluble fusible crystal clear polymeric products which are surprisingly easy to hydrogenate to form polymeric polyhydric alcohols. Polyacrolein formed by the above method can, for example, be easily hydrogenated to form polyallyl alcohol in good yields.

The special catalytic materials used in the polymerization of the unsaturated aldehydes, such as acrolein and methacrolein, comprise the oxides of metals of the group consisting of copper, silver, cesium, beryllium, mercury, lead and tin. Silver oxide, copper oxide, cesium oxide and lead oxide are particularly preferred catalysts.

The amount of catalyst employed in the polymerization of the unsaturated nitrites may vary over a considerable range. The amount may range from as low as 0.01% to as high as 10% or more of the total weight of the monomer being polymerized. In most cases, however, amounts of catalyst varying from .1% to 5% by weight of monomer are sufficient to effect a satisfactory reaction rate and this is the preferred range to be employed.

The polymerization may be carried out at temperatures ranging from about −50° C. to 250° C. Temperatures below about 0° C. are seldom employed, however, and the reaction is preferably conducted at temperatures ranging from 0° C. to 100° C.

The polymerization may be effected in bulk, solvent or aqueous emulsion or suspension systems. For most practical purposes, it is preferred to conduct the polymerization in a solvent, such as for example, ethanol, methanol, dioxane, acetonitrile, isopropyl ether, acetone-water mixtures and the like. The polymerization is preferably accomplished in the presence of solvents or diluents containing at least one OH group, such as, for example, ethanol, butanol, methanol, isopropanol, allyl alcohol, ethylene glycol. Polymers formed in the presence of these materials are particularly easy to hydrogenate. When polymerization is conducted in a solvent, the concentration of monomer may be varied over a wide range but is preferably maintained between about 10% to 60% by weight of the solvent employed.

After the polymerization has been accomplished, the polymeric aldehydes may be recovered from the reaction mixture by any suitable means, such as distillation, filtration, extraction, and the like, and the catalyst removed from the polymer by washing with water or other suitable solvent or by filtration.

The polymers of the unsaturated aldehydes produced as shown above are high molecular weight solids which may be used for a variety of applications. They may be reacted, for example, with urea and thiourea to form resins useful in the formation of film-forming materials, or they may be employed as cross-linking agents or modifiers for various resinous compositions.

They are particularly useful, however, in the preparation of polymeric polyhydric alcohols. Unlike the other polymeric aldehydes formed by the known polymerization methods, they readily react with hydrogen without depolymerization to form high molecular weight polymers having a plurality of hydroxyl groups. The hydrogenation of the polymeric aldehydes is preferably accomplished by merely treating the polymers with hydrogen at a temperature between about 50° C. and 300° C. and superatmospheric pressure in the presence of a hydrogenation catalyst.

The hydrogenation may be accomplished in the presence or absence of added diluents or solvents. In some cases, it may be desirable to employ solvents, which are relatively inert to the hydrogenation reaction, such as ethanol, isopropanol, ethylene glycol, dioxane, and the like, and mixtures thereof, to facilitate operation of the process.

Catalysts that are used in the hydrogenation are preferably the metals of groups I, II and IV to VIII of the periodic table of elements, their alloys and derivatives such as their sulfides, oxides and chromites. Examples of such catalysts include silver, copper, iron, manganese, molybdenum, nickel, palladium, platinum, chromium, cobalt, rhodium, tungsten, mixtures of the metals, such as copper-silver mixtures, copper-chromium mixtures, nickel-cobalt mixtures, and their derivatives such as copper oxide, copper chromite, nickel sulfide, silver sulfide, and the like. Particularly preferred catalysts are the members of the group consisting of nickel, copper, cobalt, iron, chromium, silver and platinum, and their oxides, sulfides and chromites. These catalysts may be employed in a finely-divided form and dispersed in and throughout the reaction mixture, or they may be employed in a more massive state, either in essentially the pure state or supported upon or carried by an inert carrier material, such as pumice, kieselguhr, diatomaceous earth, clay, alumina, charcoal, carbon, or the like, and the reaction mixture contacted therewith as by flowing the mixture over or through a bed of the catalyst or according to other methods known in the art.

The amount of the catalyst employed may vary over a considerable range depending upon the type of catalyst employed, the specific polymer, etc. In general, the amount of the catalyst will vary from 1% to 30% by weight of the reactants. Preferred amounts of catalyst range from 5% to 10% by weight. The above-noted preferred catalysts are generally employed in amounts from 5% to 10% by weight.

Temperatures used during the hydrogenation will be at least above 50° C., and generally not in excess of 300° C. Preferred temperatures range from 75° C. to 150° C. Hydrogen pressures of 250 pounds per square inch are effective, but higher pressures of the order of about 500 to 3000 p. s. i. are generally more preferred. Particularly preferred hydrogen pressures range from about 500 p. s. i. to 2000 p. s. i.

The hydrogenation may be executed in any suitable manner and in any suitable apparatus of the type that is customarily employed for hydrogenation processes. A method of carrying out the process that has been found to be advantageous comprises placing the polymer, solvent and catalyst in a pressure-resistant vessel equipped with the necessary inlets and outlets, heating means, pressure gauge, thermometer, etc., and desirably with means for agitating the contents, and subjecting the resulting mixture to the action of hydrogen gas under the aforedescribed conditions of temperature and pressure in the presence of the catalyst until absorption of hydrogen is for practical purposes complete.

At the completion of the hydrogenation, the polymeric alcohol may be recovered from the reaction mixture by any suitable manner. For example, the hydrogenation catalyst, if dispersed in the reaction mixture, may be removed by filtration, centrifugation, etc. The desired polymeric alcohol may be recovered and purified by any suitable means, such as high vacuum distillation, solvent extraction, and the like.

The polymeric polyhydric alcohols produced by the hydrogenation of the polymeric aldehydes are useful for a great many important applications. They are useful, for example, as sizing materials for textiles, as greaseproof impregnating agents for paper and electro-plating both additives and the like. They are also useful as chemical intermediates in the preparation of other valuable materials. They may be reacted with aldehydes, for example, to form resinous acetals, with nitric acid to form nitrate explosives, and with unsaturated acids to form drying oils.

The polymeric polyhydric alcohols are particularly useful as chemical intermediates in the formation of polyesters for use as plasticizers and as components for surface coating compositions. To prepare these derivatives, one heats the polymeric polyhydric alcohol with a polybasic acid or anhydride alone or with modifying agents, such as non-drying or drying oil fatty acids, preferably in an inert atmosphere. The polyesters prepared in this manner with the non-drying and drying oil fatty acids are particularly useful as additives for baking enamels containing urea and melamine-formaldehyde resins.

To illustrate the manner in which the invention may be carried out, the following examples are given. It is to be understood, however, that the examples are for the purpose of illustration and the invention is not to be regarded as limited to any of the specific materials or conditions recited therein. Unless otherwise specified, parts disclosed in the examples are parts by weight.

*Example I*

(A) A reaction vessel equipped with thermometer and stirrer is charged with 100 parts of acrolein and 1 part of silver oxide. The reaction mixture is heated to 40° C. for 40 minutes. At that time reaction takes place and in about 30 hours the acrolein has polymerized to form a white crystal clear solid.

The resulting polymer is then mixed with ethanol and treated with hydrogen at 100° C. and 1000 p. s. i. pressure in the presence of Raney nickel. During the final 3 hours hydrogen is rapidly absorbed and about 70% of the $H_2$ is reacted. Hydrogenation is continued for another 10 hours until 105% of the theoretical amount of $H_2$ is absorbed. At this time the product was all soluble in the ethanol. The mixture is removed from the hydrogenation vessel, filtered and topped at 150° C., 1 mm. to give a viscous semi-solid resin having an OH value of about 0.7 eq./100 g.

The polyhydric alcohol produced above is then reacted with an equivalent amount of phthalic anhydride and 50% by weight of cocoanut fatty acids to form an alkyd resin which can be combined with urea-formaldehyde resins to form improved baking enamels.

(B) The ability of the polymer of acrolein produced above to be hydrogenated to form the polyhydric alcohol having a fractionality is surprising in view of the fact that other polymers prepared in the presence of acids and alkali cannot be so hydrogenated. The inability of such polymers to be hydrogenated is illustrated by the following experiment showing the results obtained with a polymer formed in the presence of NaOH.

About 100 parts of acrolein is placed in a reaction vessel as shown in A above and 10% sodium hydroxide slowly added. A vigorous reaction takes place and the mixture begins to boil and becomes dangerously out of control; sometimes almost explosively rapid. In a few minutes, the acrolein has all been consumed to form a hard crusty solid.

The polymer produced above is then mixed with ethanol and treated with hydrogen at 100° C. and 2000 p. s. i. pressure in the presence of Raney nickel. After 20 hours, the polymer still remained as an insoluble polymer.

*Example II*

The reaction vessel described in Example I is charged with 100 parts of acrolein and 1 part of $Pb_3O_4$. The reaction mixture is heated to 40° C. and after about 45 minutes the acrolein begins to polymerize after heating for 24 hours a clear transparent polymer is obtained.

The resulting polymer is then mixed with ethanol and treated with hydrogen at 100° C. and 200 p. s. i. pressure in the presence of Raney nickel. At the end of the reaction, the mixture is filtered and the ethanol topped at 150° C., 1 mm. to give a viscous semi-solid polyhydric alcohol having a high hydroxyl value.

The polyhydric alcohol produced above is then reacted with phthalic anhydride and cocoanut fatty acids as shown in Example I to produce an alkyd useful in the preparation of baking enamels. Polymers of acrolein having related properties are obtained by replacing the lead oxide in the above process with same amount of each of the following: cesium oxide, beryllium oxide, copper oxide and mercury oxide.

*Example III*

The reaction vessel described in Example I is charged with 100 parts of methacrolein and 1 part of silver oxide. The reaction mixture is heated to 40° C. and after a short period, the methacrolein begins to polymerize to form a white transparent solid.

The resulting polymer is then mixed with ethanol and treated with hydrogen as shown in the preceding example. The resulting mixture is filtered and the ethanol topped at 150° C., 1 mm. to give a solid polyhydric alcohol.

The polyhydric alcohol produced above is then reacted with phthalic anhydride and cocoanut fatty acids as shown in Example I to produce an alkyd useful in the preparation of baking enamels.

*Example IV*

The reaction vessel described in Example I is charged with 100 parts of acrolein, 50 parts of ethanol and 2 parts of tin oxide. The reaction mixture is heated to 40° C. and after a short while the mixture thickens. Removal of the ethanol yields a transparent solid.

The above polymer is then mixed with ethanol and treated with hydrogen at 100° C. and 2000 p. s. i. pressure in the presence of Raney nickel. In about 3 hours, the solid has been converted to a product which is soluble in ethanol. The mixture is removed from the hydrogenation vessel, filtered and topped at 150° C.—1 mm. to give a viscous semi-solid having an OH value of about 0.69 eq./100 g.

Polymers of acrolein having related properties may be obtained by replacing the ethanol solvent with allyl alcohol and methanol.

I claim as my invention:

1. A process for polymerizing acrolein which consists of mixing a monomer composition containing acrolein with from 0.1% to 10% by weight of the total monomer of an oxide of a metal of the group consisting of copper, silver, cesium, beryllium, mercury, lead and tin at a temperature between 0° C. and 100° C.

2. A process as in claim 1 wherein the catalyst is silver oxide.

3. A process as in claim 1 wherein the catalyst is lead oxide.

4. A process as in claim 1 wherein the catalyst is tin oxide.

5. A process as in claim 1 wherein the catalyst is beryllium oxide.

6. A process for polymerizing acrolein to form polymers thereof which may be hydrogenated to form polymeric polyhydric alcohols which consists of mixing an alkanol solution of the monomer with from 0.1% to 10% by weight of total monomer of silver oxide at a temperature between 0° C. and 100° C.

References Cited in the file of this patent

UNITED STATES PATENTS

| | | |
|---|---|---|
| 2,162,616 | Hermann et al. | June 13, 1939 |
| 2,212,894 | Allen | Aug. 27, 1940 |
| 2,478,154 | Evans | Aug. 2, 1949 |
| 2,549,508 | Mottern | Apr. 17, 1951 |
| 2,554,973 | Ballard | May 29, 1951 |
| 2,657,192 | Miller et al. | Oct. 27, 1953 |

OTHER REFERENCES

Pauling: General Chemistry, Freeman & Co., 1947, page 454. (Copy in Sci. Lib.)